United States Patent
Gondre et al.

(10) Patent No.: US 11,885,239 B2
(45) Date of Patent: Jan. 30, 2024

(54) TURBOMACHINE ROTARY FAN BLADE, FAN, AND TURBOMACHINE PROVIDED THEREWITH

(71) Applicant: SAFRAN AIRCRAFT ENGINES, Paris (FR)

(72) Inventors: Guillaume Pascal Jean-Charles Gondre, Moissy-Cramayel (FR); Thomas Alain De Gaillard, Moissy-Cramayel (FR); Pierre Jean Faivre D'Arcier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/776,103

(22) PCT Filed: Nov. 18, 2020

(86) PCT No.: PCT/FR2020/052110
§ 371 (c)(1),
(2) Date: May 11, 2022

(87) PCT Pub. No.: WO2021/099736
PCT Pub. Date: May 27, 2021

(65) Prior Publication Data
US 2022/0381148 A1  Dec. 1, 2022

(30) Foreign Application Priority Data
Nov. 20, 2019 (FR) ........................................ 1912933

(51) Int. Cl.
*F01D 5/28* (2006.01)
*F01D 5/14* (2006.01)

(52) U.S. Cl.
CPC ............. *F01D 5/282* (2013.01); *F01D 5/147* (2013.01); *F05D 2300/6034* (2013.01)

(58) Field of Classification Search
CPC .......... F01D 5/147; F01D 5/282; F04D 29/32; B29C 70/24; F05D 2300/6034
See application file for complete search history.

(56) References Cited

U.S. PATENT DOCUMENTS 6,223,524 B1  5/2001 Durcan
9,914,282 B2 * 3/2018 Roach ....................... B32B 3/18
(Continued)

FOREIGN PATENT DOCUMENTS

CN  107636255 A  1/2018
CN  108005730 A  5/2018
(Continued)

OTHER PUBLICATIONS

International Search Report for PCT/FR2020/052110 dated Jan. 26, 2021.

(Continued)

*Primary Examiner* — Woody A Lee, Jr.
*Assistant Examiner* — Cameron A Corday
(74) *Attorney, Agent, or Firm* — Birch, Stewart, Kolasch & Birch, LLP

(57) ABSTRACT

The invention relates to a turbomachine rotary-fan blade having a predetermined breaking zone, which extends from the upstream edge along a given length and from the blade-tip edge over a given height. According to the invention, the body is made of a composite material comprising a fibre reinforcement obtained by three-dimensional weaving of warp and weft strands, and a resin matrix in which the fibre reinforcement is embedded, and has, in or in the vicinity of the zone, a discontinuity of at least some of the strands, configured such that the zone partially detaches (Continued)

when there is tangential friction in the thickness direction against the blade-tip edge, the height being less than 3% of the aerodynamic stream height of the blade.

31 Claims, 7 Drawing Sheets

(56) References Cited

U.S. PATENT DOCUMENTS

| | | | |
|---|---|---|---|
| 10,450,870 B2* | 10/2019 | Nandula | F02C 3/06 |
| 10,746,045 B2* | 8/2020 | Kray | F01D 21/045 |
| 11,149,558 B2* | 10/2021 | Jain | F01D 21/045 |
| 2005/0084377 A1 | 4/2005 | Dambrine et al. | |
| 2005/0106002 A1 | 5/2005 | Gerez et al. | |
| 2006/0257260 A1 | 11/2006 | Dambrine et al. | |
| 2010/0329875 A1 | 12/2010 | Kray et al. | |
| 2013/0224035 A1* | 8/2013 | Alexander | B29B 11/16 416/230 |
| 2013/0251958 A1 | 9/2013 | Gawn et al. | |
| 2016/0032729 A1 | 2/2016 | Turner | |
| 2016/0237831 A1 | 8/2016 | Strock | |
| 2017/0226867 A1 | 8/2017 | Nandula et al. | |
| 2018/0298765 A1 | 10/2018 | Beyer et al. | |
| 2018/0319100 A1 | 11/2018 | Amat | |
| 2019/0360345 A1 | 11/2019 | De Gaillard et al. | |
| 2020/0141268 A1* | 5/2020 | Kray | F01D 5/282 |

FOREIGN PATENT DOCUMENTS

| | | |
|---|---|---|
| CN | 108474259 A | 8/2018 |
| EP | 1 312 762 A1 | 5/2003 |
| EP | 3 034 785 A2 | 6/2016 |
| EP | 3 205 827 A1 | 8/2017 |
| GB | 1107024 | 3/1968 |

OTHER PUBLICATIONS

Written Opinion of the International Searching Authority for PCT/FR2020/052110 (PCT/ISA/237) dated Jan. 26, 2021.

\* cited by examiner

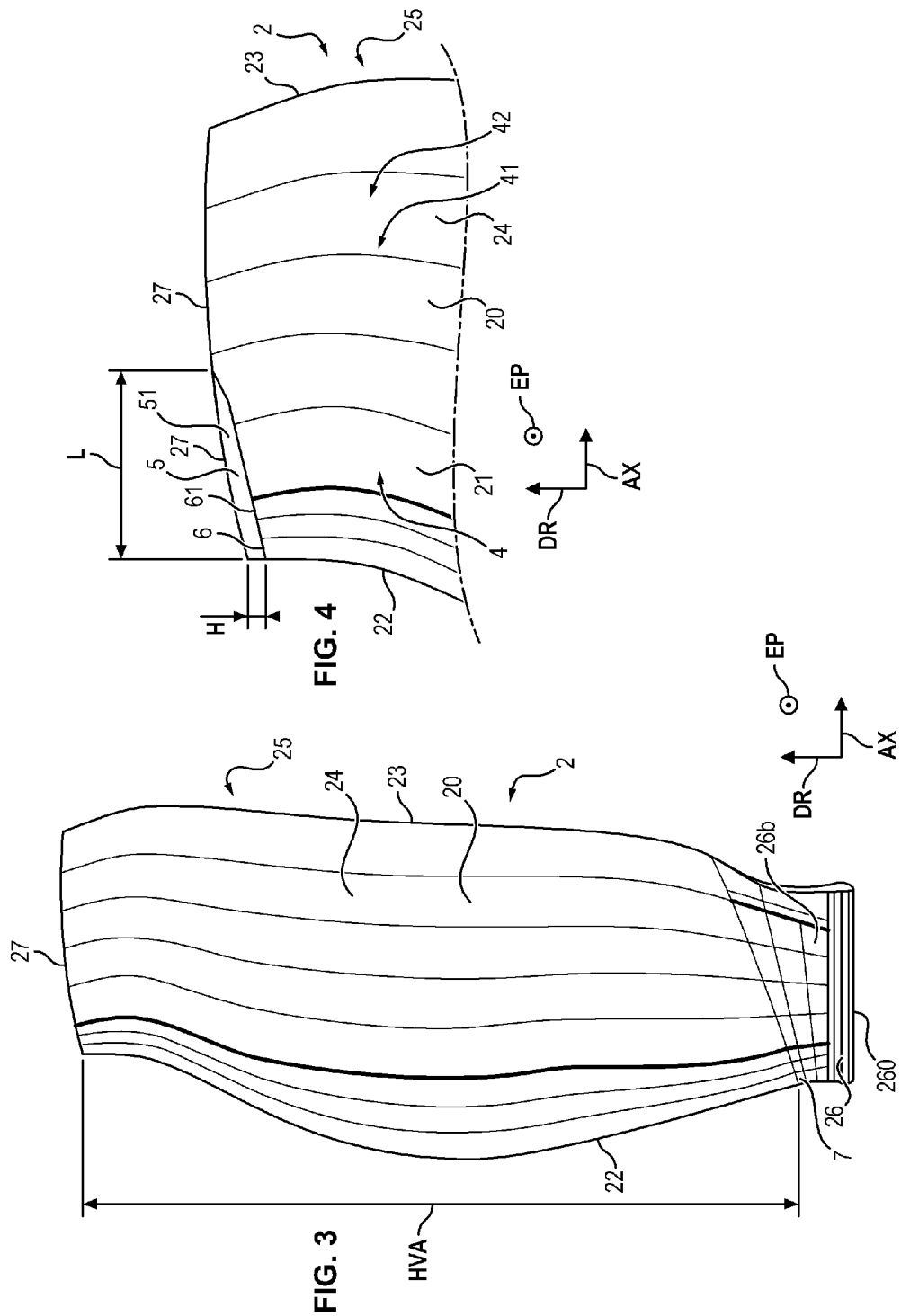

TURBOMACHINE ROTARY FAN BLADE, FAN, AND TURBOMACHINE PROVIDED THEREWITH

The invention relates to a turbomachine rotary fan blade, a turbomachine rotary fan provided with it and a turbomachine provided with it.

The field of the invention relates to aircraft turbomachines, particularly turbojets or turboprops.

It is known that turbomachine rotary fan blades rotate in a fixed casing surrounding them with a clearance between the blades and the casing, which is covered inside with an abradable material which can be filed down by the rotary blade tips. Document EP-A-1 312 762 describes blades of this type, the tips of which are able to be disintegrated by the inner wall of the retention casing in the event of an impact following the appearance of an unbalance having caused the decoupling of the bearing, in order to obtain a greater clearance necessary for the operation of the decoupler. According to this document, each blade has near its tip a weakened zone created by means of a groove provided, parallel to its tip, on the suction side face. This groove is filled with a resin which ensures the aerodynamic continuity of the suction side in proximity to the tip. The groove is made in the base material of the blade to a depth such that the remaining wall of base material in the zone of weakness beside the leading edge, the pressure side face, and the trailing edge is of sufficient strength to be capable of planing away the layer of abradable material white being sufficiently weak to break in the event of an impact occurring between the tip of the blade and the inside wall of the retention casing.

The rotation movement R of the engine causing the blade 2 to rotate with the association of various external elements such as for example bird ingestion, or vibrational phenomena, can induce sudden and substantial contacts between the blade tip 27 and the abradable material 301 located on the casing 300 of the fan, as shown in FIG. 1.

This contact between the blade and the casing can result in considerable damage. In fact, sudden punctual contact can lead to a deformation of the blade, which will increase the contact in terms of the surface area of the blade or the depth of contact in the abradable material. If the phenomenon is not controlled, this can have the consequence of damaging the blade until considerable material losses occur.

To avoid this specific case, the radial clearance J at the fan tip 280 and the volume of the blade 2 are dimensioned so as to avoid the engagement of the latter in the abradable material leading to damage to the engine.

Studies have shown that when the blade operates at high speed, it is deformed under the centrifugal effect and aerodynamic forces. The radial clearance J at the blade tip is reduced and it appears that in certain cases this clearance J does not ensure a sufficient margin for avoiding contact between the blade teap 27 and the abradable material. This friction induces on the blade tip 27 a tangential load, shown schematically by the arrows F of FIG. 2, directed from the intrados 24 toward the extrados 25 of the blade 2, in the direction opposite to the rotation of the blade 2 around the axis AX of rotation of the engine.

This stress involves an additional deformation of the blade. Several cases can then occur.

According to a first case, if this deformation induces an increase in clearance so as to reduce the forces and disengage the blade from the abradable material, the blade is defined as non-engaging. It is then considered that in this first case the behavior of the blade is good when it enters into contact with the abradable material.

On the contrary, according to a second case, if a consumption of the positive clearance is induced by the deformation, the blade is defined as self-engaging. In this second case, the blade will continue to sink into the abradable material and the forces on the blade will increase. The blade and the portions surrounding it can then undergo serious damage.

The simplest solution for avoiding this self-engagement phenomenon, or at least reducing its criticality, is to increase the clearance at the blade tip in order to have an additional margin prior to contact of the blade with the abradable material. This strategy allows avoiding any damage to the engine but can have a non-negligible influence on the aerodynamic performance of the blading. The fact of increasing the tip clearance increases the leakage flow rate and the associated losses in this zone.

The invention seeks to obtain a turbomachine rotary fan blade allowing limiting the criticality of self-engagement on the blade without deterioration of the aerodynamic performance.

To this end, a first subject matter of the invention is a blade for a turbomachine rotary fan, the blade comprising a body having an upstream edge and a downstream edge, between which the body extends along a first longitudinal direction, an extrados and an intrados, between which the body extends along a second thickness direction, which is transverse to the first direction, a blade root and an upper blade tip edge, between which the body extends along a third height direction, transverse to the first and second directions, a function of the blade root being to be fixed to a longitudinal rotary fan hub, the blade comprising a predetermined breaking zone, which extends from the upstream edge over a determined non-zero length along the first longitudinal direction and which extends from the blade tip edge over a determined non-zero height along the third height direction, the blade being characterized in that the body is made of a composite material comprising a fiber reinforcement obtained by three-dimensional weaving of warp strands extending at least along the third height direction and of weft strands extending at least along the first longitudinal direction, and a resin matrix in which the fiber reinforcement is embedded, the body has, in or in proximity to the predetermined breaking zone at least one discontinuity of at least certain of the warp strands and/or of at least certain of the weft strands, configured so that the predetermined breaking zone is partially detached in presence of tangential friction extending in the second thickness direction against the blade tip edge, the determined non-zero height of the predetermined breaking zone being less than 3% of an aerodynamic stream height of the blade, defined from the upper blade tip edge to an aerodynamic stream starting point of the blade, which is located at a distance from the blade root and which is intended to be in contact with an inter-blade platform along the third height direction.

Thanks to the invention, the wear of the outer blade tip edge during its possible rotation against the abradable material of the fan casing can be progressive to retain a sufficient height of the blade tip, reducing the leakage flow rate between the blade and this casing, while still avoiding the self-engagement of the second case mentioned above. Thus, during a contact of the blade against the abradable material of the casing of the fan with large forces, small pieces of the breaking zone leaving the blade tip edge will detach progressively, which avoids damaging the rest of the blade as well as the surrounding parts and disengages the blade relative to the abradable material. The invention allows improving the aerodynamic performance and limiting damage during critical events leading to a self-engagement phenomenon of the blade. The predetermined breaking zone or fusible zone on a self-engaging blade allows disengaging the blade during a contact, thus limiting damage to the blade tip. Thus, rather than changing many parts during a critical event leading to a self-engagement phenomenon of the blade, only the blade will need to be repaired or replaced. The determination of the blade tip clearances no longer takes into account the self-engaging nature of a blade. It is then possible to reduce the clearances, which improves the aerodynamic performance of the blade. Thus, the dimensioning of a blade depending on the engine target (diameter, speed of rotation, etc.) will determine the optimal solution for creating the predetermined breaking zone among the embodiments proposed.

According to an embodiment of the invention, the discontinuity is embodied by the fact that the fiber reinforcement has a first volume ratio of the strands relative to a volume of the resin matrix, present in a main zone located outside the predetermined breaking zone and has in the predetermined breaking zone a second volume ratio of the strands relative to the volume of the resin matrix, the second volume ratio of the strands being less than the first volume ratio of the strands.

According to an embodiment of the invention, the discontinuity is embodied by the fact that the predetermined breaking zone consists of the resin matrix and comprises neither warp strands nor weft strands in the determined non-zero height.

According to another embodiment of the invention, the discontinuity of the warp strands and/or of the weft strands is located in at least one transition from the main zone to the predetermined breaking zone, the transition being distant by the determined non-zero height from the blade tip edge, the predetermined breaking zone comprising, in the determined non-zero height, the fiber reinforcement obtained by three-dimensional weaving, having the second volume ratio of the warp strands extending at least along the third height direction and of the weft strands extending at least along the first longitudinal direction, and the resin matrix in which the fiber reinforcement is embedded.

According to an embodiment of the invention, the first volume ratio of the strands is greater than 50% and the second volume ratio of the strands is comprised between 10% and 40%.

According to another embodiment of the invention, the discontinuity is embodied by an end of the warp strands, distant by the determined non-zero height from the blade tip edge, the predetermined breaking zone consists of the resin matrix and of weft strands of the fiber reinforcement with no warp strands in the determined non-zero height up to the blade tip edge.

According to another embodiment of the invention, the discontinuity is embodied by a breaking of the warp strands, distant by the determined non-zero height from the blade tip edge, the predetermined breaking zone comprising, in the determined non-zero height up to the blade tip edge, the fiber reinforcement obtained by three-dimensional weaving of the warp strands extending at least along the third height direction and of the weft strands extending at least along the first longitudinal direction and the resin matrix in which the fiber reinforcement is embedded.

According to another embodiment of the invention, the discontinuity is embodied by a breaking of only certain of the warp strands, called first warp strands, the breaking of the first warp strands being distant by the determined non-zero height from the blade tip edge, while retaining a continuity of the other warp strands, called second warp strands, the predetermined breaking zone comprising, in the determined non-zero height up to the blade tip edge, the fiber reinforcement obtained by three-dimensional weaving of the first warp strands and of the second warp strands extending at least along the third height direction and of the weft strands extending at least along the first longitudinal direction, and the resin matrix in which the fiber reinforcement is embedded.

According to another embodiment of the invention, the first warp strands represent a percentage greater than or equal to 10% and less than or equal to 50% relative to the total number of the first warp strands and of the second warp strands in the predetermined breaking zone.

According to another embodiment of the invention, the discontinuity is embodied by cut or discontinuous warp strands and/or by cut or discontinuous weft strands in the predetermined breaking zone.

According to an embodiment of the invention, the determined length of the predetermined breaking zone from the upstream edge is greater than or equal to 20% of a length of the upper blade tip edge and less than or equal to 35% of the length of the upper blade tip edge.

Certain of the features of the embodiments, as stated above, can possibly be combined.

A second subject matter of the invention is a turbomachine rotary fan, comprising a longitudinal rotary fan hub and a plurality of blades as described above, which are fixed at their blade root to the longitudinal rotary fan hub.

A third subject matter of the invention is a turbomachine comprising a rotary fan as described above and, downstream of the fan, at least one compressor, a combustion chamber and at least one turbine.

The invention will be better understood upon reading the description that follows, given solely by way of a non-limiting example with reference to the figures below of the appended drawings.

FIG. 3 shows a schematic side view of a blade according to embodiments of the invention.

FIG. 4 shows an enlarged side view of the tip of the blade of FIG. 3, according to a first embodiment of the invention.

Figure 11:
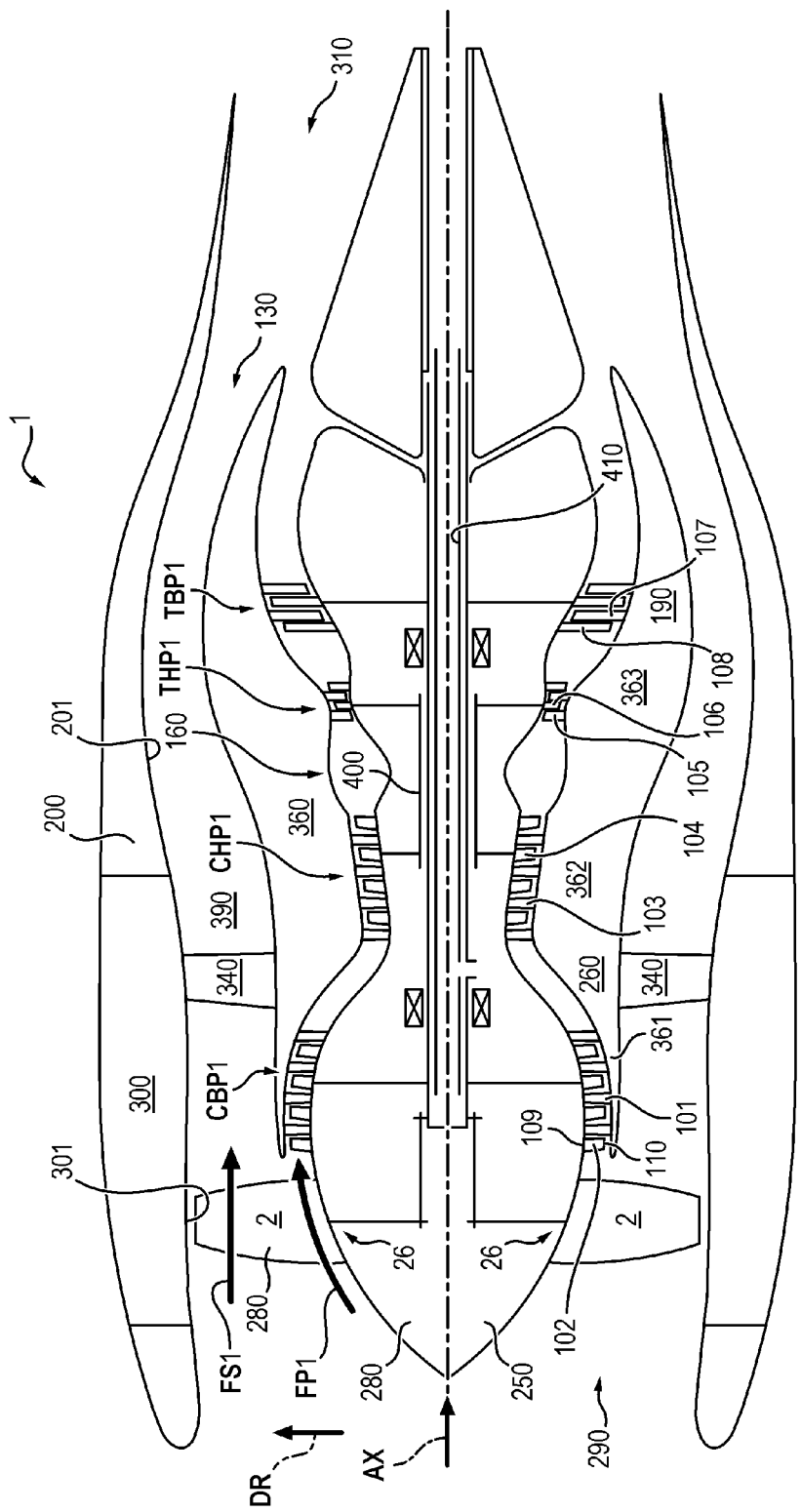
FIG. 11 shows a schematic axial section view of a turbomachine comprising the blade according to the invention.

Described below in more detail with reference to FIG. 11 is an example of a turbomachine 1 on which can be used the rotary fan blade(s) 2 according to the invention.

As is known, the turbomachine 1 shown in FIG. 11 is intended to be installed on an aircraft (not shown) to propel it through the air.

The gas turbine assembly or turbomachine 1 extends around an axis AX or axial direction AX (or first longitudinal direction AX mentioned below) oriented from upstream to downstream. Hereafter, the terms "upstream," respectively "downstream" or "forward," respectively "rearward," or "left" respectively "right" or "axially" are taken along the general direction of the gas which flow in the turbomachine along the axis AX. The direction extending from the inside to the outside is the radial direction DR (or third height direction DR mentioned below) starting from the axis AX.

The turbomachine 1 has for example two bodies. The turbomachine 1 comprises a first stage formed by a rotary fan 280 and a central gas turbine engine 130, located downstream of the rotary fan 280. The central gas turbine engine 130 comprises, from upstream to downstream in the gas flow direction, a low-pressure compressor CBP1, a high-pressure compressor CHP1, a combustion chamber 160, a high-pressure turbine THP1 and a low-pressure turbine TBP1, which delimit a primary gas flow FP1.

The rotary fan 280 comprises a set of rotary fan blades 2 extending radially outward from a rotary fan hub 250. The rotary fan blades 2 are surrounded on the outside by a fan casing 300, comprising one or more layers 301 of an abradable material on its surface located facing the blade tips 27 of the blades 2.

The turbomachine 1 has an upstream intake end 290 located upstream of the fan 280, and a downstream exhaust end 310. The turbomachine 1 also comprises an inter-stream casing 360 which delimits a primary stream in which the primary flow FP1 circulates, which passes downstream of the fan 280 through the low-pressure compressor CBP1, the high-pressure compressor CHP1, the high-pressure turbine THP1 and the low-pressure turbine TBP1.

The inter-stream casing 360 comprises, from upstream to downstream, a casing 361 of the low-pressure compressor CBP1, an intermediate casing 260, which is interposed between the low-pressure compressor CBP1 and the high-pressure compressor CHP1, a casing 362 of the high-pressure compressor CHP1, a casing 363 of the high-pressure turbine THP1 and a casing 190 of the low-pressure turbine TBP1.

The low-pressure compressor CBP1 and the high-pressure compressor CHP1 can each comprise one or more stages, each stage being formed by a set of fixed blades (or stator blading) and a set of rotary blades (or rotor blading).

The fixed blades 101 of the low-pressure compressor CBP1 are attached to the casing 361. The rotary blades 102 of the low-pressure compressor CBP1 are attached to a first rotary transmission shaft 410.

The fixed blades 103 of the high-pressure compressor CHP1 are attached to the casing 362. The rotary blades 104 of the high-pressure compressor CHP1 are attached to a second rotary transmission shaft 400.

The high-pressure turbine THP1 and the low-pressure turbine TBP1 can each comprise one or more stages, each stage being formed by a set of fixed blades (or stator blading) and a set of rotary blades (or rotor blading).

The fixed blading 105 of the high-pressure turbine THP1 are fixed to the casing 363. The rotary blades 106 of the high-pressure turbine THP1 are attached to the second rotary transmission shaft 400.

The fixed blades 107 of the low-pressure turbine TBP1 are fixed to the casing 190. The rotary blades 108 of the low-pressure turbine TBP1 are fixed to the first rotary transmission shaft 41.

The rotary blades 108 of the low-pressure turbine TBP1 drive the rotary blades 102 of the low-pressure compressor CBP1 in rotation around the axis AX under the effect of the thrust of the gases coming from the combustion chamber 160. The rotary blades 106 of the high-pressure turbine THP1 drive the rotary blades 104 of the high-pressure compressor CHP1 in rotation around the axis AX under the effect of the thrust of the gases coming from the combustion chamber 160.

The rotary fan blades 2 are upstream of the blades 101, 102, 103, 104, 105, 106, 107 and 108 and have a shape different from them.

In operation, air flows through the rotary fan 280 and a first portion FP1 (primary flow FP1) of the air flow is routed through the low-pressure compressor CBP1 and the high-pressure compressor CHP1, in which the flow of air is compressed and sent to the combustion chamber 160. The hot combustion products (not shown in the figures) coming from the combustion chamber 160 are used to drive the turbines THP1 and TBP1 and thus produce the thrust of the turbomachine 1. The turbomachine 1 also comprises a secondary stream 390 which is used to pass a secondary flow FS1 of the air flow of the rotary fan 280 around the inter-stream casing 360. More precisely, the secondary stream 390 extends between an inner wall 201 of the shroud 200 or nacelle 200 and the inter-stream casing 360 surrounding the central gas turbine engine 130, the fan casing 300 being the upstream portion of this shroud 200 or nacelle 200. Arms 340 connect the intermediate casing 260 to the inner wall 201 of the shroud 200 in the secondary stream 390 of the secondary flow FS1.

Below, the rotary fan blade 2 according to the invention is described with reference to FIGS. 1 to 10.

The body 20 extends between an upstream edge 22 and a downstream edge 23 distant from the upstream edge along the first longitudinal direction AX. The body 20 has a three-dimensional curvature in several plane sections taken perpendicular to the first longitudinal direction AX.

The body 20 extends between an extrados 24 and an intrados 25, distant from the extrados 24 along the second thickness direction EP transverse to the first direction AX. The extrados 24 is turned outward in the direction of rotation of the fan blade 2 when the fan hub 250 to which the blade root 26 is attached rotates around the axial direction AX. The body 20 has a three-dimensional curvature in several plane sections taken perpendicular to the second thickness direction EP. The extrados 24 is asymmetrical with respect to the intrados 25.

The body 20 extends between a blade root 26 and the upper blade tip edge 27 of the body 20, distant from the blade root 26 along the third height direction DR, transverse to the first and second directions AX and EP. The blade root 26 serves to be fixed to the rotating longitudinal fan hub 250. To this end, the blade root 26 can have a thickened transvers section, having for example the shape of a dovetail or other, along the direction EP relative to an intermediate zone 26b located between the blade root 26 and the upper blade tip edge 27. The blade root 26 can thus be inserted into a peripheral recess of the fan hub 250 to be fixed there.

According to an embodiment, a metal reinforcement part is glued upstream of the upstream edge 22 (not shown, also called a shield) forming a leading edge of the blade 2. The reinforcing part 3 has as its function to face the aerodynamic flow entering in flight to respond to the problem of blade erosion and protection of the blade against bird ingestion.

The body 20 of the blade 2 is made of a composite material woven in three dimensions in a resin 43. The body 20 made of composite material comprises a resin matrix 43 in which a fiber reinforcement 4, comprising warp strands 41 extending at least along the third height direction DR and weft strands 42 extending at least along the first longitudinal direction AX, is embedded in the finished state of the blade 2.

A possible manufacturing method of the blade 2 is the following. The warp strands 41 are woven in three dimensions with the weft strands 42 to form the fiber reinforcement 4 during a first, weaving step. FIGS. 6 to 10 show the perform 40 of the fiber reinforcement 4 flattened upon completion of this first, weaving step. Then, during a second, molding step, the fiber reinforcement 4 is placed in a mold, where the fiber reinforcement 4 is deformed according to a predetermined three-dimensional curvature imposed by a prescribed three-dimensional curvature of the inner walls of the mold, then resin 43 is injected around the fiber reinforcement 4 in the mold, to give the three-dimensional shape of the blade 2 in the finished state. After molding the resin 43 around the fiber reinforcement 4, the warp strands 41 and the weft strands 42 have the three-dimensional curvature mentioned above of the blade 2 in the finished state.

The fiber reinforcement 4 can be formed starting with a fiber perform in a single piece obtained by three-dimensional or multi-layer weaving with changing thickness. It comprises warp and weft strands which can comprise in particular carbon, glass, basalt and/or aramid fibers. The matrix is typically a polymer matrix, for example epoxy, bismaleimide or polyimide for example. The blade 2 is then formed by molding of resin 43 by means of a vacuum injection process of the RTM type (for "Resin Transfer Molding"), or even VARRTM (for Vacuum Resin Transfer Molding). It is understood that by three-dimensional weaving is meant that the strands follow sinuous trajectories in order to interlink the warp strands belonging to different layers of warp strands, except for delinkage, it being noted that a three-dimensional weave, particularly with an interlock pattern, can comprise surface two-dimensional weaves. Different weaving patterns can be used, such as interlock, multi-satin or multi-ply.

The blade comprises a predetermined breaking zone 5 (or fuse zone 5) starting from an upstream portion of the blade tip edge 27. The predetermined breaking zone 5 is present in a self-engaging portion of the blade 2, i.e. a portion which can come into contact with the abradable material 301 of the casing 300 of the fan 280, as defined below. The predetermined breaking zone 5 is present over a determined non-zero height H from the blade tip edge 27 along the third height direction DR. The predetermined breaking zone 5 is present over a determined non-zero length L starting from the upstream edge 22 along the first longitudinal direction AX. Thus, in the case of a large force on the blade tip edge 27 due to contact with the abradable material 301, the fuse edge 5 will be partially detached from the blade, which will allow directly departing from contact with the abradable material 301. The dimensions of the fuse zone 5 can be determined depending on the dimensions of the portions of the blade closest to the abradable material 301.

The determined non-zero height H of the predetermined breaking zone 5 is less than 3% of the aerodynamic stream height HVA of the blade 2 at its leading edge or at its upstream edge 22, and therefore of the total height of the blade 2 between the lower surface 260 of the blade root 26 and the blade tip edge 27 at its leading edge or at its upstream edge 22. According to an embodiment, the determined non-zero height H of the predetermined breaking zone 5 is less than or equal to 2%, and for example less than or equal to 1.5% of the aerodynamic stream height HVA of the blade 2 at its leading edge or at its upstream edge 22, and therefore of the total height of the blade 2 between the lower surface 260 of the blade root 26 and the blade tip edge 27 at its leading edge or at its upstream edge 22. The determined non-zero height H of the predetermined breaking zone 5 is greater than 0.5% of the aerodynamic stream height HVA of the blade 2 at its leading edge or at its upstream edge, and in particular greater than 1% of the aerodynamic stream height HVA. For example, the height H can be approximately 1 cm for a total height of approximately 90 cm between the lower surface 260 of the blade root 26 and the blade tip edge 27 at its leading edge. The aerodynamic stream height HVA is the greatest distance along the height direction DR between the blade tip edge 27 and the point 7 where the aerodynamic stream of the blade 2 begins. The point 7 where the aerodynamic stream begins is the point that is both closest to the central hub 250 rotating around the axial direction AX, and facing axially the aerodynamic flow displaced by the blade 2, and located on the blade 2. The point 7 where the aerodynamic stream begins is located at a distance from the blade root 26 along the height direction DR and is intended to be in contact with an inter-blade platform which provides the junction between two blades adjacent to one another on the outer periphery of the hub 250. The determined non-zero height H of the predetermined breaking zone 5 can vary depending on the determined position in its length L and can for example be inclined relative to longitudinal direction AX.

According to an embodiment of the invention, the determined length L is greater than the determined height H.

According to an embodiment of the invention, the determined length L of the predetermined breaking zone 5 starting at the upstream edge 22 is greater than or equal to 20%, particularly 25%, of a length of the upper blade tip edge 27 and less than or equal to 35% of the length of the upper blade tip edge 27 in the first longitudinal direction AX. The determined length L of the predetermined breaking zone 5 can for example be approximately 30% of the length of the upper blade tip edge 27. In fact, experiments have shown that the blades 2 are particularly self-engaging on this length L starting from the upstream edge 22, to reach a maximum at the leading edge. Of course, in other embodiments, the length L could extend until the downstream 23 or trailing 23 edge.

The body 20 made of composite material has, in or in proximity to the predetermined breaking zone 5, at least one discontinuity 6 of at least certain of the warp strands 41 and/or a discontinuity 6 of at least certain of the weft strands 42, configured so that the predetermined breaking zone 5 is partially detached in the presence of tangential friction F extending in the second thickness direction EP against the blade tip edge 27.

Thus, the invention allows progressive wear of the predetermined breaking zone 5 of the blade tip edge 27 against the abradable material 301 during the rotation of the blade 2 in the casing 300 of the fan 280 of the turbojet 1 while releasing, due to the constitution of this predetermined breaking zone 5, small pieces of the predetermined breaking zone 5. Compared to document EP-A-1312 762, the invention avoids a groove on a major portion of the thickness below the blade tip edge 27 and avoids breaking of the blade tip at once at this groove over a great height located above this groove as soon as the blade tip edge 27 first contacts the casing 300 of the fan 280, while the destruction of the groove according to document EP-A-1 312 762 releases, on the contrary, a large piece which risks damaging the rest of the blade. Compared to the blade of document EP-A-1 312 762, the invention thus allows increasing the aerodynamic performance of the blading and reducing the leakage flow rate of the fan 280 after the breaking of the blade tip edge 27 against the abradable material of the casing 300 of the fan.

This breaking zone 5 and this discontinuity 6 can be in the form of one of the breaking zones 51, 52, 53, 54 and 55 having respectively the discontinuity 61, 62, 63, 64, 66 and 65 in the respective embodiments of FIGS. 4, 7, 8, 9A, 9B and 10, which are described below.

In the embodiments of FIGS. 4, 7, 8, 9A and 9B, the discontinuity 6, 61, 62, 63, 64, 66 is located in proximity to the predetermined breaking zone 5, 51, 52, 53, 54, 56 and is distant from the blade tip edge 27 by the predetermined height H. In the embodiment of FIG. 10, the discontinuity 6, 65 is distributed in the predetermined breaking zone 5, 55.

Figure 1:
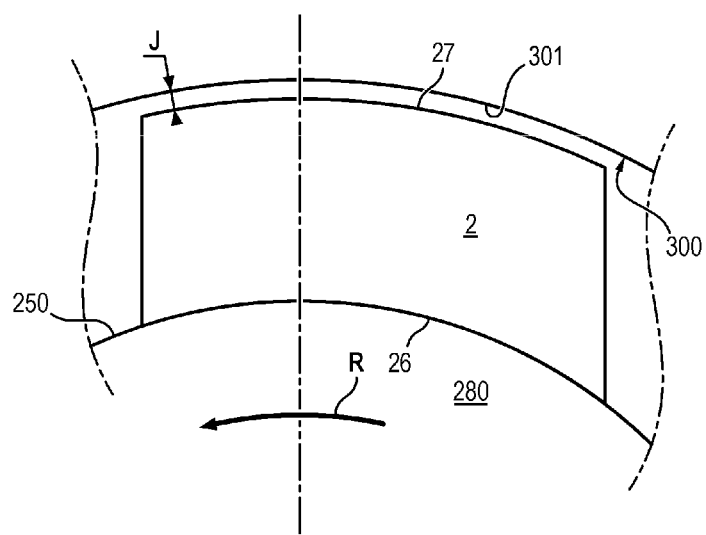
FIG. 1 shows a schematic front view of a blade according to the prior art.
Figure 2:
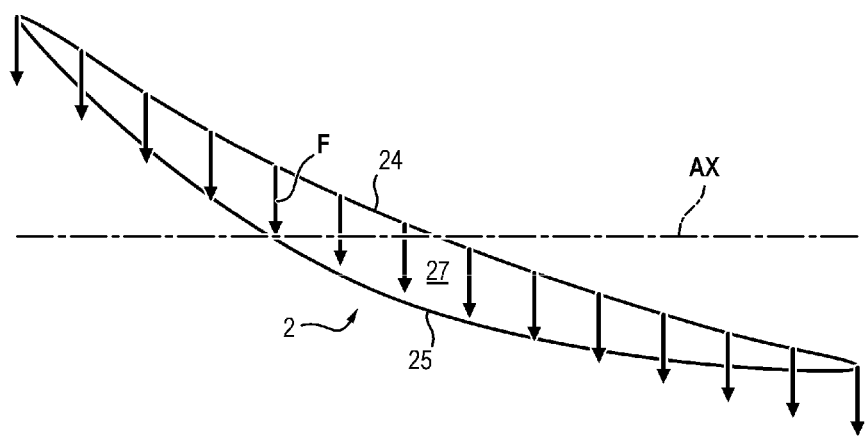
FIG. 2 shows a schematic view along a radial direction of the tip of a blade according to the prior art.
Figure 6:
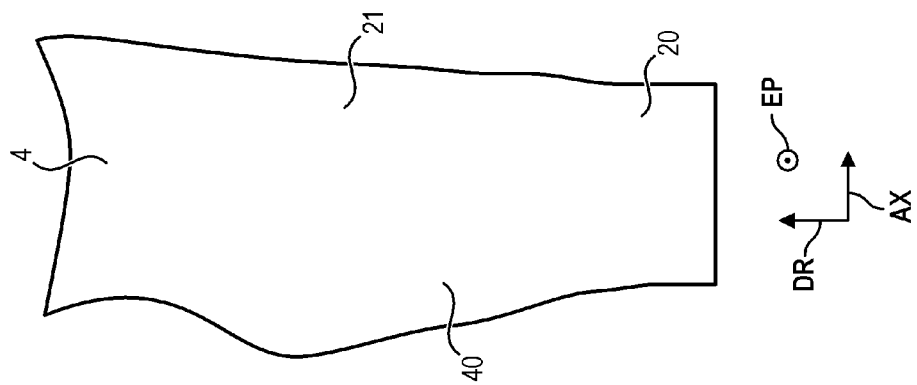
FIG. 6 shows an enlarged schematic side view of a preform of the blade of FIG. 5 according to embodiments of the invention.
Figure 5:
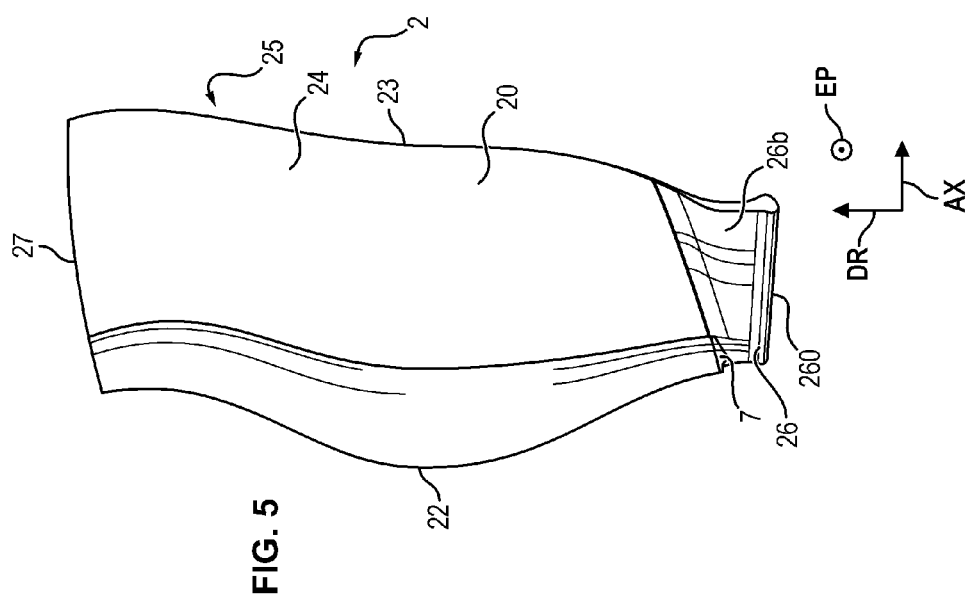
FIG. 5 shows an enlarged schematic side view of the tip of the blade according to embodiments of the invention.
Figure 7:
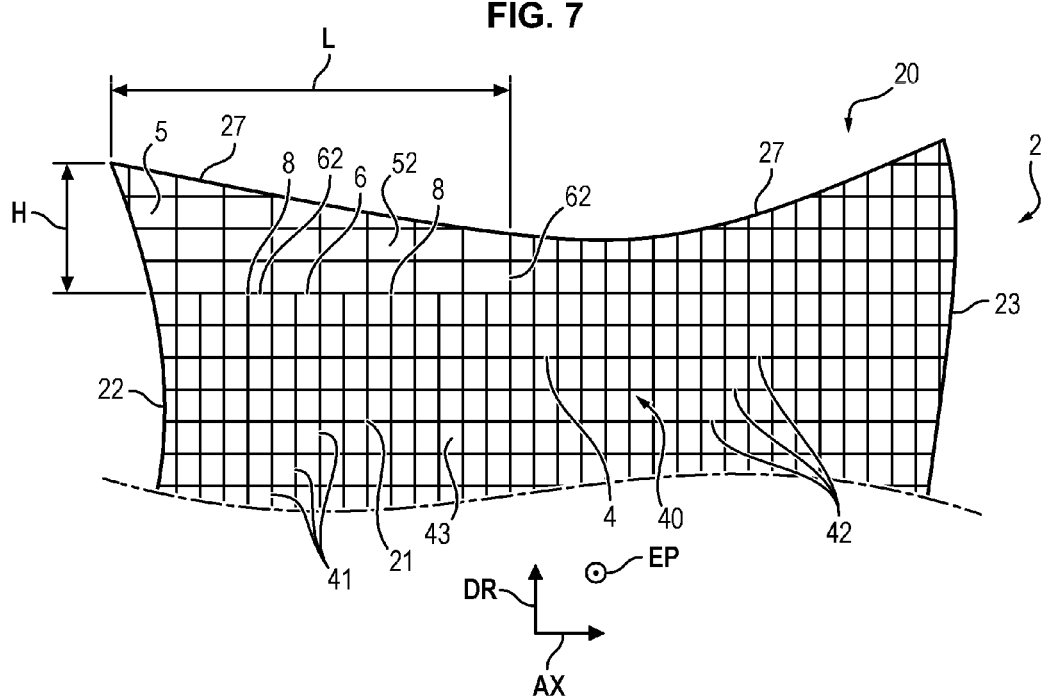
FIG. 7 shows an enlarged schematic side view of the tip of a preform of the blade of FIG. 6 according to a second embodiment of the invention.
Figure 8:
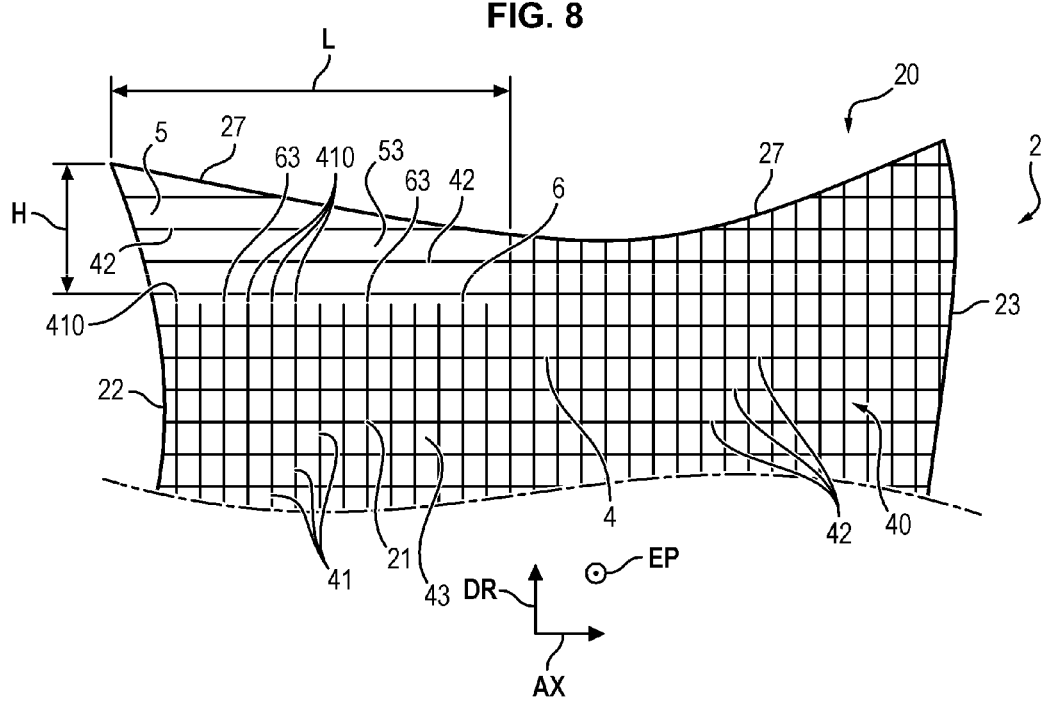
FIG. 8 shows an enlarged schematic side view of the blade tip of a preform of the blade of FIG. 6 according to a third embodiment of the invention.

In the embodiments of FIGS. 4, 7 and 8, the discontinuity 6, 61, 62, 63 is embodied by the fact that the fiber reinforcement 4 has, on the one hand, a first volume ratio of the warp strands 41 extending at least along the third height direction DR and of the weft strands 42 extending at least along the first longitudinal direction AX, present in a main zone 21 located outside the predetermined breaking zone 5, 51, 52, 53, and has on the other hand, in the predetermined breaking zone 5, 51, 52, 53 a second volume ratio of the strands 41 and 42, which is less than the first volume ratio of the strands 41 and 42. The first and second volume ratios of warp strands 41 and of weft strands 42 are taken with respect to the volume of the resin matrix 43 in the zones considered, 21 and 5. The blade therefore passes, at the discontinuity 6, 61, 62, 63, from the first volume ratio of the strands 41 and 42 of the main zone 21 to the second volume ratio of the strands 41 and 42 of the predetermined breaking zone 5, 51, 52, 53. The predetermined breaking zone 5, 51, 52, 53 has, in the entire height H and in the entire length L a second stiffness, which is less than the first stiffness of the main zone 21. To accomplish the second volume ratio of the strands 41, 42, it is possible to remove warp strands 41 and/or weft strands 42 from the preform 40 in order to reduce the number of strands warp strands 41 and/or of weft strands 42 remaining in the fuse zone 5 of the preform 40, the volume of the warp strands 41 and/or of the weft strands 42 having been removed then being filled in with the resin 43.

According to an embodiment, the first volume ratio of the strands 41, 42 is greater than 50%, particularly greater than 55%, and may even be equal for example to approximately 60%. The second volume ratio of the strands 41, 42 is comprised between 10% and 40%, which allows maintaining sufficient stiffness to withstand normal engine operating conditions, while ensuring a sufficient difference in material properties relative to the rest of the blade 2 to act as a fuse zone 5.

In the embodiment of FIG. 4, the discontinuity 6, 61 is embodied by the fact that the predetermined breaking zone 5, 51 consists only of the resin matrix 43 and comprises neither warp strands 41 nor weft strands 42 in the determined non-zero height H and in the determined length L and therefore has a zero second volume ratio of the strands 41 and 42 in the predetermined breaking zone 5, 51. In fact, the stiffness (less than 10 GPa) of the resin alone is less than the stiffness (several hundred GPa) of the composite formed by the fiber reinforcement 4 having the strands 41 and 42 embedded in the resin 43. The variations in properties between the strands 41, 42 and the resin 43 are thereby used to create the fuse zone 5. The resin being sensitive to erosion, it is possible to increase the surface area of a coating (polyurethane for example) covering the intrados 25 of the composite blade in order to cover the resin surplus zone 5.

In the embodiment of FIG. 7, the discontinuity 6, 62 of the warp strands 41 and/or of the weft strands 42 is located in at least one transition 8 from the main zone 21 to the predetermined breaking zone 5, 52. The transition 8 from the main zone 21 to the predetermined breaking zone 5, 52 is distant from the blade tip edge 27 by the determined non-zero height H. The predetermined breaking zone 5, 52 comprises, in the determined non-zero height H and in the determined length L, the fiber reinforcement 4 obtained by three-dimensional weaving, having the second volume ratio of the warp strands 41 extending at least along the third height direction DR and of the weft strands 42 extending at least along the first longitudinal direction AX, and the resin matrix 43 in which the fiber reinforcement 4 is embedded.

In the embodiment of FIG. 8, the discontinuity 6, 63 is embodied by an end 410 of the warp strands 41, distant from the blade tip edge 27 by the determined non-zero height H. The predetermined breaking zone 5, 53 consist of the resin matrix 43, in which are embedded only the weft strands 42 of the fiber reinforcement 4 without warp strands 41 in the determined non-zero height H until the blade tip edge 27 and in the determined length L. To create this predetermined breaking zone 5, 53, it is possible to remove the warp strands 41 outside the fuse zone 5 of the preform 40, the volume of the removed warp strands 41 having been removed then being filled in by the resin 43. The blade 2 thus maintains a minimum strength in the weft direction. This strength can be necessary to limit the displacement and the camber of the sections of the blade in engine operation.

Figure 9A:
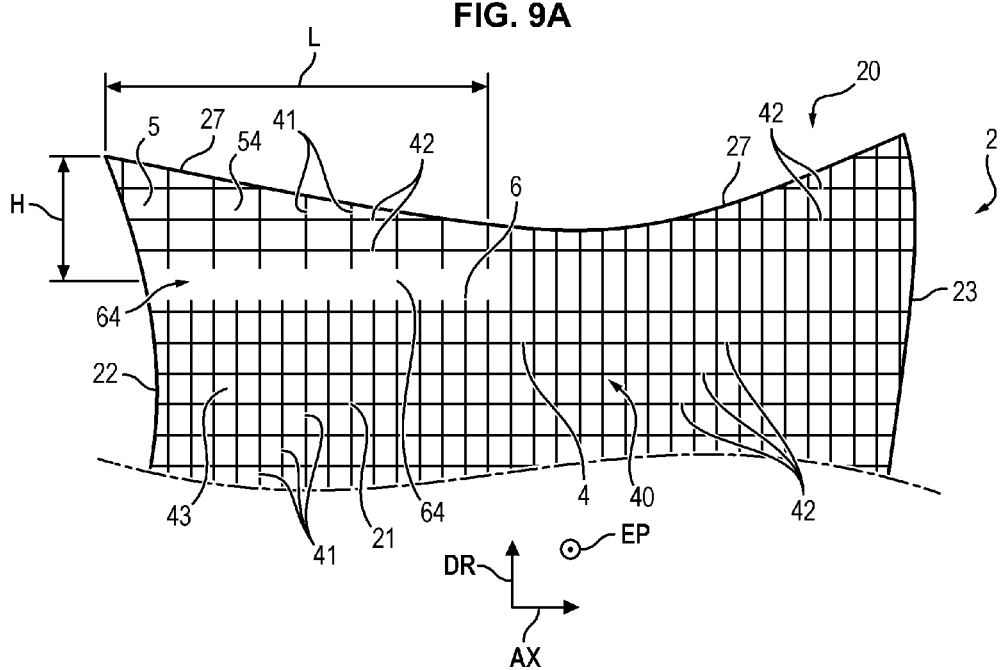
FIG. 9A shows an enlarged schematic side view of the blade tip of a preform of the blade of FIG. 6 according to a fourth embodiment of the invention.
Figure 10:
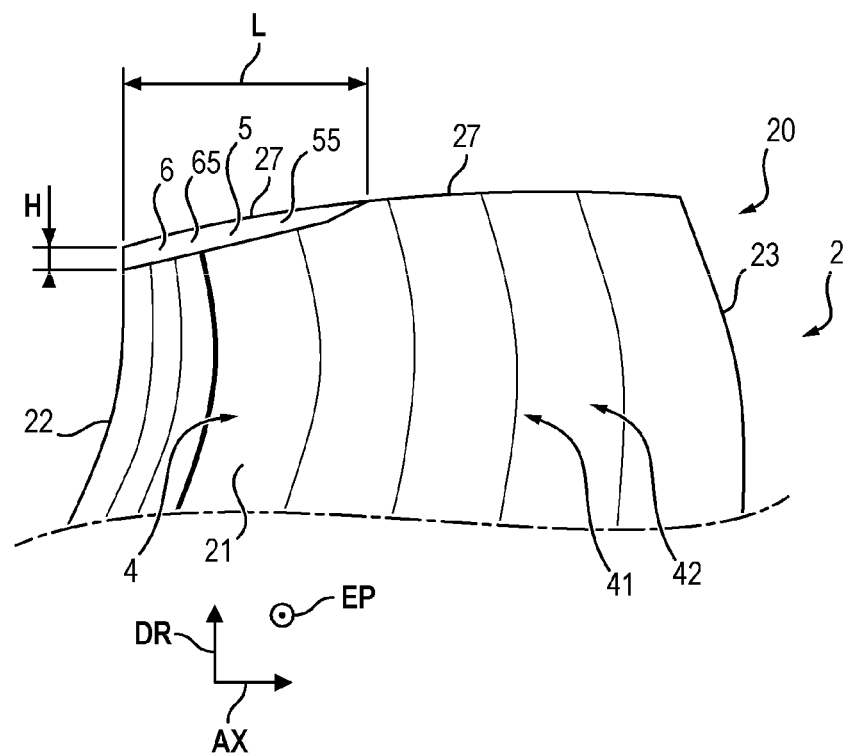
FIG. 10 shows an enlarged schematic side view of the blade tip of a preform of the blade of FIG. 6 according to a fifth embodiment of the invention.

In the embodiment of FIG. 9A, the discontinuity 6, 64 is embodied by a breaking of the warp strands 41, distant from the blade tip edge 27 by the determined non-zero height H. The predetermined breaking zone 5, 54 comprises, in the determined non-zero height H until the blade tip edge 27, the fiber reinforcement 4 obtained by three-dimensional weaving of the warp strands 41 extending at least along the third height dimension DR and of the weft strands 42 extending at least along the first longitudinal direction AX, and the resin matrix 43 in which the fiber reinforcement 4 is embedded. During the weaving of the preform 40, this discontinuity 6, 64 is produced by departures and entries of warp strands 41 at the fuse zone 5. This allows creating a weakening operating in the fuse zone 5 in the event of contact with the abradable material 301.

Figure 9B:
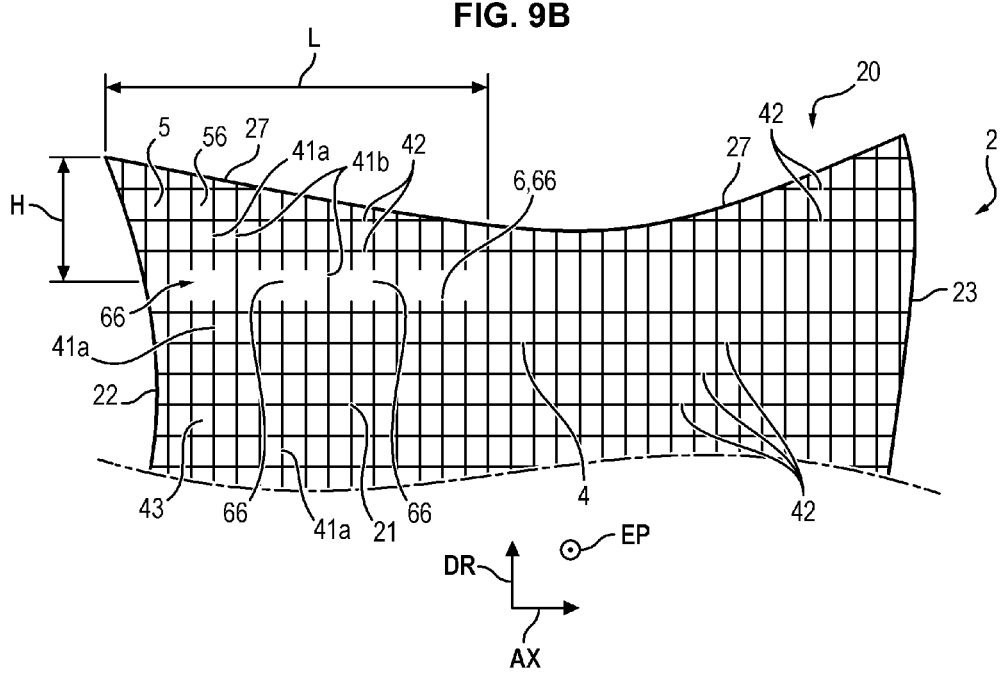
FIG. 9B shows an enlarged schematic side view of the blade tip of a preform of the blade of FIG. 6 according to a sixth embodiment of the invention.

In the embodiment of FIG. 9B, the discontinuity 6, 66 is embodied by a breaking of only certain 41a of the warp strands 41, called first warp strands 41a. The breaking of the first warp strands 41a is distant from the blade tip edge 27 by the determined non-zero height H. The continuity of the other 41b of the warp strands 41, called second warp strands 41b is maintained. The predetermined breaking zone 5, 56 comprises, in the determined non-zero height H up to the blade tip edge 27, the fiber reinforcement 4 obtained by the three-dimensional weaving of the first and second warp strands 41a, 41b extending at least along the third height direction DR and of the weft strands 42 extending at least along the first longitudinal direction AX, and the resin matrix 43 in which the fiber reinforcement 4 is embedded. A minimum strength is thus maintained in the warp direction while maintaining the fuse zone 5, 56. During the weaving of the preform 40, this discontinuity 6, 66 is created by departures, then entries of the first warp strands 41a at the fuse zone 5. This allows creating a weakening acting as fuse zone 5 in the event of contact with the abradable material 301. According to an embodiment, the first warp strands 41a have a percentage greater than or equal to 10% and less than or equal to 50% relative to the total number of first and second warp strands 41a, 41b in the predetermined breaking zone 5, 56.

In the embodiment of FIG. 10, the discontinuity 6, 65 is embodied by cut or discontinuous warp strands 41 and/or by cut or discontinuous weft strands 42 in the predetermined breaking zone 5, 55 in the entire height H and in the entire length L. The cut or discontinuous warp strands 41 and/or the cut or discontinuous weft strands 42 are embedded in the resin matrix 43 in the predetermined breaking zone 5, 55. According to an embodiment, the cut or discontinuous warp strands 41 and/or the cut or discontinuous weft strands 42 are long in that each of them has a length greater than or equal to 1 cm. According to an embodiment, the cut or discontinuous warp strands 41 and/or the cut or discontinuous weft strands 42 are oriented randomly in the predetermined breaking zone 5, 55. The predetermined breaking zone 5, 55 has a smaller stiffness and a smaller elongation to breaking than the main zone 21. These variations thus allow creating the fuse zone 5, 55.

Of course, the embodiments, features, possibilities and examples described above can be combined together or be selected independently of one another.

The invention claimed is:

1. A blade for a turbomachine rotary fan, the blade comprising a body having an upstream edge and a downstream edge, between which the body, extends along a first longitudinal direction, an extrados and an intrados, between which the body extends along a second thickness direction, which is transverse to the first direction, a blade root and an upper blade tip edge, between which the body extends along a third height direction, transverse to the first longitudinal direction and to the second thickness directions, a function of the blade root being to be fixed to a longitudinal rotary fan hub, the blade comprising a predetermined breaking zone, which extends from the upstream edge over a determined non-zero length along the first longitudinal direction and which extends from the upper blade tip edge over a determined non-zero height along the third height direction, wherein the body is made of a composite material comprising a fiber reinforcement obtained by three-dimensional weaving of first warp strands extending at least along the third height direction and of weft strands extending at least along the first longitudinal direction, and a resin matrix in which the fiber reinforcement is embedded, the first warp strands comprise second warp strands, which have at least one discontinuity in or in proximity to the predetermined breaking zone and which are configured so that the predetermined breaking zone is partially detached in the presence of tangential friction extending in the second thickness direction against the upper blade tip edge, the determined non-zero height of the predetermined breaking zone being less than 3% of an aerodynamic stream height of the blade, defined from the upper blade tip edge to an aerodynamic stream starting point of the blade, which is located at a distance from the blade root and which is intended to be in contact with an interblade platform along the third height direction.

2. The blade according to claim 1, wherein the at least one discontinuity is embodied by the fact that the fiber reinforcement has a first volume ratio of the first warp strands and of the weft strands relative to a volume of the resin matrix, present in a main zone located outside the predetermined breaking zone and has in the predetermined breaking zone a second volume ratio of the first warp strands and of the weft strands relative to the volume of the resin matrix, the second volume ratio of the first warp strands and of the weft strands being less than the first volume ratio of the first warp strands and of the weft strands.

3. The blade according to claim 1, wherein the at least one discontinuity is embodied by the fact that the predetermined breaking zone consists of the resin matrix and comprises neither first warp strands nor weft strands in the determined non-zero height.

4. The blade according to claim 2, wherein the at least one discontinuity of the second warp strands is located in at least one transition from the main zone to the predetermined breaking zone, the transition being distant by the determined non-zero height from the upper blade tip edge, the predetermined breaking zone comprising, in the determined non-zero height, the fiber reinforcement obtained by three-dimensional weaving, having the second volume ratio of the first warp strands extending at least along the third height direction and of the weft strands extending at least along the first longitudinal direction, and the resin matrix in which the fiber reinforcement is embedded.

5. The blade according to claim 1, wherein the first volume ratio of the first warp strands of and the weft strands is greater than 50% and the second volume ratio of the first warp strands and of the weft strands is comprised between 10% and 40%.

6. The blade according to claim 1, wherein the at least one discontinuity is embodied by an end of the second warp strands, distant by the determined non-zero height from the upper blade tip edge, the predetermined breaking zone consists of the resin matrix and of weft strands of the fiber reinforcement with no first warp strands in the determined non-zero height up to the upper blade tip edge.

7. The blade according to claim 1, wherein the at least one discontinuity is embodied by a breaking of the second warp strands, distant by the determined non-zero height from the upper blade tip edge, the predetermined breaking zone comprising, in the determined non-zero height up to the upper blade tip edge, the fiber reinforcement obtained by three-dimensional weaving of the second warp strands extending at least along the third height direction and of the weft strands extending at least along the first longitudinal direction and the resin matrix in which the fiber reinforcement is embedded.

8. The blade according to claim 1, wherein the at least one discontinuity is embodied by a breaking of the second warp strands, the breaking of the second warp strands being distant by the determined non-zero height from the upper blade tip edge, while retaining a continuity of the first warp strands, which are not second warp strands and which are called third warp strands, the predetermined breaking zone comprising, in the determined non-zero height up to the upper blade tip edge, the fiber reinforcement Obtained by three-dimensional weaving of the second warp strands and of the third warp strands extending at least along the third height direction and of the weft strands extending at least along the first longitudinal direction, and the resin matrix in which the fiber reinforcement is embedded.

9. The blade according to claim 8, wherein the second warp strands represent a percentage greater than or equal to 10% and less than or equal to 50% relative to the total number of the second warp strands and of the third warp strands.

10. The blade according to claim 1, wherein the at least one discontinuity is embodied by the fact that the second warp strands are cut or discontinuous in the predetermined breaking zone.

11. The blade according to claim 1, wherein the determined non-zero length of the predetermined breaking zone from the upstream edge is greater than or equal to 20% of a length of the upper blade tip edge and less than or equal to 35% of the length of the upper blade tip edge.

12. A turbomachine rotary fan, comprising a longitudinal rotary fan hub and a plurality of blades according to claim 1, which are fixed at their blade root to the longitudinal rotary fan hub.

13. A turbomachine comprising a rotary fan according to claim 12 and downstream of the fan, at least one compressor, a combustion chamber and at least one turbine.

14. A blade for a turbomachine rotary fan, the blade comprising a body having an upstream edge and a downstream edge, between which the body extends along a first longitudinal direction, an extrados and an intrados, between which the body extends along a second thickness direction, which is transverse to the first direction, a blade root and an upper blade tip edge, between which the body extends along a third height direction, transverse to the first longitudinal direction and to the second thickness directions, a function of the blade root being to be fixed to a longitudinal rotary fan hub, the blade comprising a predetermined breaking zone, which extends from the upstream edge over a determined non-zero length along the first longitudinal direction and which extends from the upper blade tip edge over a determined non-zero height along the third height direction, wherein the body is made of a composite material comprising a fiber reinforcement obtained by three-dimensional weaving of warp strands extending at least along the third height direction and of first weft strands extending at least along the first longitudinal direction, and a resin matrix in which the fiber reinforcement is embedded, the first weft strands comprise second weft strands, which have at least one discontinuity in or in proximity to the predetermined breaking zone and which are configured so that the predetermined breaking zone is partially detached in the presence of tangential friction extending in the second thickness direction against the upper blade tip edge, the determined non-zero height of the predetermined breaking zone being less than 3% of an aerodynamic stream height of the blade, defined from the upper blade tip edge to an aerodynamic stream starting point of the blade, which is located at a distance from the blade root and which is intended to be in contact with an inter-blade platform along the third height direction.

15. The blade according to claim 14, wherein the at least one discontinuity is embodied by the fact that the fiber reinforcement has a first volume ratio of the warp strands and of the first weft strands relative to a volume of the resin matrix, present in a main zone located outside the predetermined breaking zone and has in the predetermined breaking zone a second volume ratio of the warp strands and of the first weft strands relative to the volume of the resin matrix, the second volume ratio of the warp strands and of the first weft strands being less than the first volume ratio of the warp strands and of the first weft strands.

16. The blade according to claim 14, wherein the at least one discontinuity is embodied by the fact that the predetermined breaking zone consists of the resin matrix and comprises neither warp strands nor first weft strands in the determined non-zero height.

17. The blade according to claim 15, wherein the at least one discontinuity of the second weft strands is located in at least one transition from the main zone to the predetermined breaking zone, the transition being distant by the determined non-zero height from the upper blade tip edge, the predetermined breaking zone comprising, in the determined non-zero height, the fiber reinforcement obtained by three-dimensional weaving, having the second volume ratio of the warp strands extending at least along the third height direction and of the first weft strands extending at least along the first longitudinal direction, and the resin matrix in which the fiber reinforcement is embedded.

18. The blade according to claim 14, wherein the first volume ratio of the warp strands and of the first weft strands is greater than 50% and the second volume ratio of the warp strands and of the first weft strands is comprised between 10% and 40%.

19. The blade according to claim 14, wherein the at least one discontinuity is embodied by the fact that the second weft strands are cut or discontinuous in the predetermined breaking zone.

20. The blade according to claim 14, wherein the determined non-zero length of the predetermined breaking zone from the upstream edge is greater than or equal to 20% of a length of the upper blade tip edge and less than or equal to 35% of the length of the upper blade tip edge.

21. A turbomachine rotary fan, comprising a longitudinal rotary fan hub and a plurality of blades according to claim 14, which are fixed at their blade root to the longitudinal rotary fan hub.

22. A turbomachine comprising a rotary fan according to claim 21 and downstream of the fan, at least one compressor, a combustion chamber and at least one turbine.

23. A blade for a turbomachine rotary fan, the blade comprising a body having an upstream edge and a downstream edge, between which the body extends along a first longitudinal direction, an extrados and an intrados, between which the body extends along a second thickness direction, which is transverse to the first direction, a blade root and an upper blade tip edge, between which the body extends along a third height direction, transverse to the first longitudinal direction and to the second thickness directions, a function of the blade root being to be fixed to a longitudinal rotary fan hub, the blade comprising a predetermined breaking zone, which extends from the upstream edge over a determined non-zero length along the first longitudinal direction and which extends from the upper blade tip edge over a determined non-zero height along the third height direction, wherein the body is made of a composite material comprising a fiber reinforcement obtained by three-dimensional weaving of first warp strands extending at least along the third height direction and of first weft strands extending at least along the first longitudinal direction, and a resin matrix in which the fiber reinforcement is embedded, the first warp strands comprise second warp strands, which have at least one warp strand discontinuity in or in proximity to the predetermined breaking zone, the first weft strands comprise second weft strands, which have at least one weft strand discontinuity in or in proximity to the predetermined breaking zone, the first warp strands and the first weft strands being configured so that the predetermined breaking zone is partially detached in the presence of tangential friction extending in the second thickness direction against the upper blade tip edge, the determined non-zero height of the predetermined breaking zone being less than 3% of an aerodynamic stream height of the blade, defined from the upper blade tip edge to an aerodynamic stream starting point of the blade, which is located at a distance from the blade root and which is intended to be in contact with an interblade platform along the third height direction.

24. The blade according to claim 23, wherein the at least one warp strand discontinuity and the at least one weft strand discontinuity are embodied by the fact that the fiber reinforcement has a first volume ratio of the first warp strands and of the first weft strands relative to a volume of the resin matrix, present in a main zone located outside the predetermined breaking zone and has in the predetermined breaking zone a second volume ratio of the first warp strands and of the first weft strands relative to the volume of the resin matrix, the second volume ratio of the first warp strands and of the first weft strands being less than the first volume ratio of the first warp strands and of the first weft strands.

25. The blade according to claim 1, wherein the at least one warp strand discontinuity and the at least one weft strand discontinuity are embodied by the fact that the predetermined breaking zone consists of the resin matrix and comprises neither first warp strands nor first weft strands in the determined non-zero height.

26. The blade according to claim 24, wherein the at least one warp strand discontinuity and the at least one weft strand discontinuity are located in at least one transition from the main zone to the predetermined breaking zone, the transition being distant by the determined non-zero height from the upper blade tip edge, the predetermined breaking zone comprising, in the determined non-zero height, the fiber reinforcement obtained by three-dimensional weaving, having the second volume ratio of the first warp strands extending at least along the third height direction and of the first weft strands extending at least along the first longitudinal direction, and the resin matrix in which the fiber reinforcement is embedded.

27. The blade according to claim 23, wherein the first volume ratio of the first warp strands and of the first weft strands is greater than 50% and the second volume ratio of the first warp strands and of the first weft strands is comprised between 10% and 40%.

28. The blade according to claim 23, wherein the at least one warp strand discontinuity and the at least one weft strand discontinuity are embodied by the fact that the second warp strands are cut or discontinuous in the predetermined breaking zone and by the fact that the second weft strands are cut or discontinuous in the predetermined breaking zone.

29. The blade according to claim 23, wherein the determined non-zero length of the predetermined breaking zone from the upstream edge is greater than or equal to 20% of a length of the upper blade tip edge and less than or equal to 35% of the length of the upper blade tip edge.

30. A turbomachine rotary fan, comprising a longitudinal rotary fan hub and a plurality of blades according to claim 23, which are fixed at their blade root to the longitudinal rotary fan hub.

31. A turbomachine comprising a rotary fan according to claim 30 and downstream of the fan, at least one compressor, a combustion chamber and at least one turbine.

\* \* \* \* \*